(12) United States Patent
Keogh (10) Patent No.: US 6,691,952 B2
(45) Date of Patent: Feb. 17, 2004

(54) AIRCRAFT MEDICAL UNIT (76) Inventor: Marvin Keogh, 7309 Clybourn Ave., Sun Valley, CA (US) 91352

( * ) Notice: Subject to any disclaimer, the term of this patent is extended or adjusted under 35 U.S.C. 154(b) by 0 days.

(21) Appl. No.: 10/254,491

(22) Filed: Sep. 25, 2002

(65) Prior Publication Data

US 2003/0057323 A1 Mar. 27, 2003

Related U.S. Application Data (60) Provisional application No. 60/324,871, filed on Sep. 26, 2001.

(51) Int. Cl.[7] .............................................. B64D 25/04
(52) U.S. Cl. ................... 244/118.5; 244/118.6; 244/137.2; 5/118
(58) Field of Search ................. 244/118.5, 118.6, 244/118.1, 137.1, 137.2; 5/118, 625, 94

(56) References Cited

U.S. PATENT DOCUMENTS 3,898,704 A * 8/1975 Gallaher et al. ................. 5/2.1
4,115,884 A * 9/1978 Keogh ........................... 5/625
5,259,575 A * 11/1993 Cabrera ..................... 244/118.5
5,481,770 A * 1/1996 Ahlsten .......................... 5/625
5,813,629 A * 9/1998 Cabrera ..................... 244/118.6
6,195,821 B1 * 3/2001 Hall et al. ....................... 5/626
6,273,366 B1 * 8/2001 Sprenger et al. .......... 244/118.5

FOREIGN PATENT DOCUMENTS

FR          2576761 A1 *  8/1986     ........... A47C/17/50

* cited by examiner

Primary Examiner—Michael J. Carone
Assistant Examiner—Gabriel S. Sukman
(74) Attorney, Agent, or Firm—Colin P. Abrahams (57) ABSTRACT An aircraft medical unit comprises a front panel configured to fit in an aircraft cabin so as to form a divider inside the cabin and a spaced rear panel of substantially the same shape as that of the front panel. A side panel is constructed between the front and rear panels, and the front, rear and side panels defines a chamber. An access opening is formed in the front panel. A stretcher frame is provided and is movable between a folded and stowed position in the chamber and an unfolded and extended position to the outside of the chamber. The aircraft medical unit further includes at least one item of medical equipment used in the treatment of a patient.

27 Claims, 7 Drawing Sheets

AIRCRAFT MEDICAL UNIT

CROSS REFERENCE TO RELATED APPLICATIONS

This application claims the benefit of U.S. Provisional Patent Application No. 60/324,871 filed Sep. 26, 2001, and which is incorporated herein by reference in its entirety.

FIELD AND BACKGROUND OF THE INVENTION

This invention relates to medical units for use in aircraft. More particularly, the invention is for modular units which can be attached within the cabin of an aircraft, and especially in large commercial airliners configured for passenger transportation.

In this specification, the term "medical units" should be broadly interpreted to mean medical equipment and machinery typically used in the treatment of patients. All of this equipment and machinery is, in accordance with the invention, housed within a modular unit which can be placed in the cabin of an aircraft, or other convenient location in an aircraft, so that the contents are generally hidden from view, and the modular unit occupies as little space as possible, until needed. The equipment and machinery which may comprise the medical unit includes, but is not limited to, stretchers which can be folded out and retracted in relation to the medical unit, power systems and power adaptation units, incubators, refrigerators, appropriate lighting mechanisms, communication systems for use by personnel operating the medical unit to communicate with either other crew members within the aircraft or medical and health professionals in remote ground locations, various body-function monitoring devices, and the like. These are representative examples only, and the scope of the invention is such that the extent and use of such equipment can be varied according to the situation. Other types of equipment which may be incorporated into the medical unit of the invention will be discussed during the course of this specification.

Air transportation is, of course, a major industry for the conveyance, on a large scale, of substantial numbers of people between many locations. Depending upon the size of the jet liner, commercial air liners during flight may be transporting anywhere from about 50 to nearly 500 passengers. While it is not unusual for some aircraft, particularly the larger aircraft with substantial numbers of passengers, to carry certain medical equipment to treat onboard medical emergencies, such equipment found on board is typically very limited in scope, and only capable of treating some of the most basic medical problems.

Furthermore, the issue of space in an aircraft cabin is critical in commercial airliners, and compacting galleys, storage areas and other components/compartments to an optimal degree allows more passengers to be accommodated within the aircraft.

The typical layout in an aircraft cabin consists of both rows and lines of seats extending down the length of the cabin. At certain intervals, walls or dividers are formed between rows of seats, and these have the effect, amongst other things, of separating the aircraft cabin into preselected and desired areas. The dividers, may, therefore, divide a large cabin into different classes of passenger travel, such as first class, business class and economy class. They also typically define one or more galley areas where flight attendants are able to prepare food and drinks.

As an example of the limited nature of any relevant prior art, U.S. Pat. No. 4,115,884 (Keogh) discloses a carrier for medical stretchers on aircraft. The installation consists of two frames with vertical and diagonal members supporting a horizontal rack, which has clamps with which to attach the stretcher to a top surface.

One of the purposes of the present invention is therefore to provide an aircraft medical unit to include a plurality of modern devices used in health care treatment, especially configured for optimum use inside the cabin of an aircraft.

SUMMARY OF THE INVENTION

In one aspect, the present invention utilizes an adaptation of a wall or divider within the cabin of an aircraft. The divider of the present invention may comprise a pair of spaced walls defining a chamber or space which, as will be discussed in greater detail below, is designed to compactly house various forms of medical equipment. Particularly, this medical unit of the invention comprises a module, which, in the normal course, partitions off areas within the cabin. However, the spaced-apart walls form a closet or space between them, in which medical equipment may be stored and easily accessed when needed. An important component of the medical unit, in modular form as described above, would be the presence of a stretcher, located within the space between the walls, which can be unfolded out of the space, and formed into a substantially horizontally positioned bed for use by a person requiring medical treatment.

The present invention thus takes advantage of typical cabin layout which utilizes partitions or dividers between sections of the aircraft cabin. Presently, these dividers may consist of nothing more than panels, which of course divide sections of the aircraft so that one section cannot be seen by passengers in an adjacent section. In most instances, the dividers may be no more than 4–8 inches thick, serving as they do, as physical dividers and nothing more. The invention, in one aspect, slightly expands these dividers so as to form a double-paneled unit, defining a space, and placing within the space a potentially vast array of sophisticated medical equipment, in addition to a stow-away stretcher. Compacting all this equipment into such an area, termed herein a medical unit, not only has the advantage of optimal space utilization, but also serves to keep medical equipment generally out of sight of passengers, but at the same time providing very easy access to such stored equipment should it be needed.

The medical unit of the invention would, in a preferred form, comprise various doors to chambers which may house various forms of medical equipment and supplies, ranging from simple first aid and/or trauma kit supplies to sophisticated medical equipment, including respirators, suction apparatus, oxygen equipment, defibrillators and the like. Thus, the space in the medical unit of the invention may be further divided into cupboards, chambers, accessible recesses etc., all of which are configured to best accommodate the different forms of equipment being stored.

The medical unit may further comprise a monitor, global positioning system (GPS), and cameras which may allow personnel and passengers on board to communicate, when necessary, with a doctor in a land-based hospital, contacted to provide guidance and information for on-board medical treatment. Preferably, the medical unit will be constructed as a modular unit, manufactured in an appropriate facility, and designed to be rolled in and installed in a specific aircraft. Therefore, the unit would typically have a vertical edge, a horizontal edge for mounting on the floor, and a contoured edge which would be custom-shaped to fit within the body of a specific commercial airliner, such as a Boeing 747, Airbus 320, or the like.

In a preferred form, the modular medical unit would easily attach to existing structural fasteners already located in the aircraft, so that they may be easily installed and removed as desired. Further, larger aircraft may be designed to accommodate more than one modular medical unit. In yet another form, a plurality of modular medical units of the invention may be lined up and installed within an aircraft cabin or cargo bay for transportation to remote sites where emergency workers may require temporary hospital facilities.

A significant advantage on the present invention is its compactness. The medical unit of the invention facilitates storage of a significant number of medical devices and pieces of equipment within a very small area, some of which may be folded out for use when needed. The invention thus would meet the needs and requirements of commercial carriers, which would be able to install sophisticated medical equipment capable of treating a wide range of conditions, but, when not needed, would take up very little space, and further be invisible to passengers. In other words, the medical unit of the invention may not even be recognizable as such when in a closed or unused position, and would merely appear to the casual observer to be a wall or divider separating the cabin into conventional and recognizable segments.

According to one aspect of the invention, there is provided an aircraft medical unit comprising a front panel configured to fit in an aircraft cabin so as to form a divider inside the cabin; a rear panel of substantially the same shape as that of the front panel and spaced therefrom; a side panel between the front and rear panels, the front, rear and side panels defining a chamber; an access opening in the front panel; and a stretcher frame, movable between a folded and stowed position in the chamber and an unfolded and extended position to the outside of the chamber. Preferably, the front panel is configured so as to fit in the aircraft cabin between rows of seats, the front, rear and side panels following the contour of the shape of at least a portion of the aircraft cabin, the medical unit comprises at least one item of medical equipment used in the treatment of a patient.

The equipment may be selected from amongst the following: a monitor, a camera, a refrigerator, an incubator, a defibrillator, a respirator, an oxygen supply, and an autoclave.

Preferably, the access opening can be opened and closed by doors, which may comprise a pair of slidable shutters which run in tracks formed within the chamber of the medical unit. The aircraft medical unit may further comprise a plurality of cupboards, each cupboard accommodating selected medical equipment or machinery.

In one embodiment, the stretcher frame comprises a head end portion, a foot end portion and a foot end support leg, wherein the head end portion and foot end portions, and the foot end support leg are pivotally connected to each other so as to fold for stowage within the chamber, the head end portion and foot end portion unfolding in the extended position to form a substantially rectangular stretcher frame, and the foot end support leg being attached to the foot end portion and unfoldable with respect thereto, the head end portion being securely fastened to a clamp within the chamber when in the extended position, and the foot end support leg being unfolded to fasten to the aircraft cabin when in the extended position.

Preferably, the aircraft medical unit further comprises a mattress frame and an associated mattress connectable to the stretcher frame. Adjustable lighting for positioning over the stretcher may also be provided.

Preferably, the aircraft medical unit further comprises a power unit. Also, a power converter for converting aircraft power into a power source usable by the medical equipment may be provided.

The stretcher frame may be spring-mounted within the chamber to facilitate movement thereof between the folded and the stowed position on the one hand, and the unfolded and extended position on the other. Further, a clamping member for attaching an item of medical equipment to the stretcher frame at a desired location may be provided.

In one form, attachment members are provided for securing the medical unit to tracks constructed in the cabin of the aircraft.

DETAILED DESCRIPTION OF THE INVENTION

Reference is now made to the accompanying drawings which show different applications and conditions of the medical unit, in accordance with the present invention.

Figure 1:
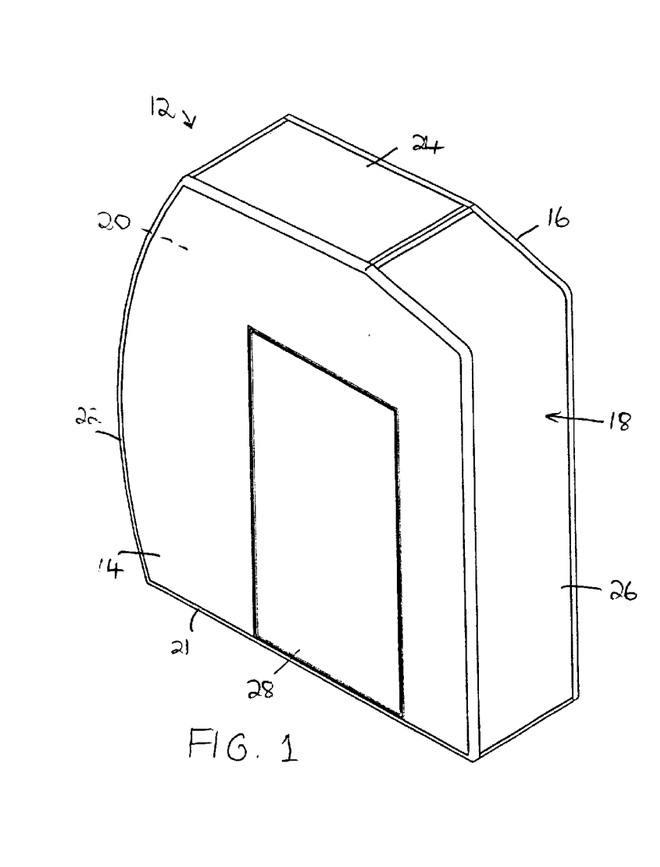
FIG. 1 is a perspective rear view of a medical unit in accordance with the invention.

With reference to FIG. 1, there is shown a medical unit 12, from a rear view perspective, which generally comprises a rear panel 14, a front panel 16, and side wall, indicated generally by reference numeral 18. The front and rear panels 16 and 14, and the side wall 18, define a chamber 20 for housing various items of medical equipment and machinery, as will be described. The side wall 18 comprises a base wall 21, including a mechanism for fastening the medical unit 12 to existing tracks in an aircraft, as will be described below. Additionally, there is provided a contoured wall 22, a top wall 24 and an aisle wall 26, all of which constitute the side wall 18. The rear panel 14 further includes an access door 28, which can be opened and closed as appropriate for the purposes of installing, maintaining and servicing components of the medical unit.

Figure 2:
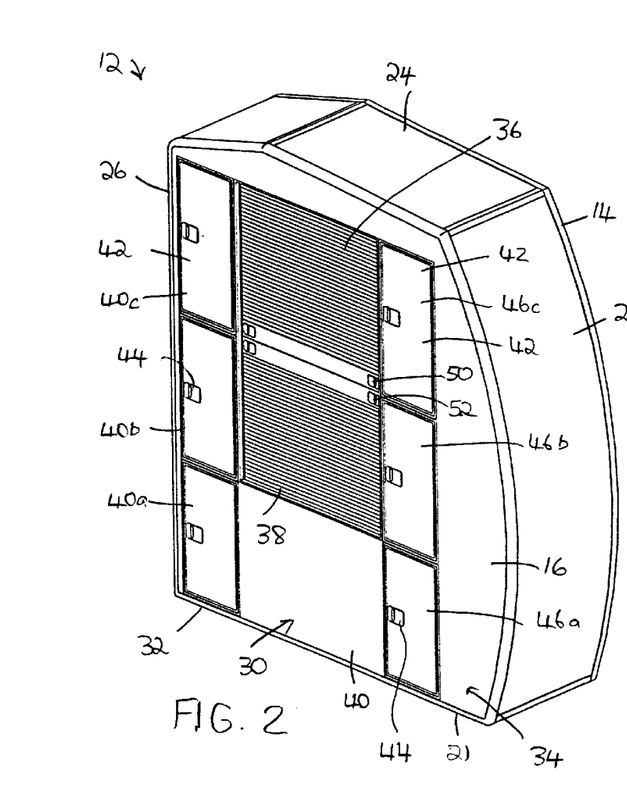
FIG. 2 is a front view of the medical unit of the invention as shown in FIG. 1 of the drawings, generally in the closed or unused position.

FIG. 2 of the drawings shows the medical unit 12, and particularly a front view thereof. The front panel 16 is clearly shown, and comprises a central portion 30, and lateral portions 32 and 34. The central portion 30 includes an upper slidable shutter 36 and a lower slidable shutter 38 which may be moved upwardly and downwardly respectively in order to gain access to the chamber 20, and its contents. Below the lower slidable shutter 38 is a fixed panel 40.

The lateral portion 32 comprises three stacked cupboards 40a, 40b and 40c, each of which has its own door 42, and each door 42, which may be mounted on hinges, can be opened or closed by manipulating the handle 44 associated therewith. Likewise, the lateral portion 34 also has three stacked cupboards 46a, 46b and 46c, each of which has a door 42, preferably mounted on hinges, which open and close using handle 44.

As a general rule, the central portion 30 of the medical unit 12 provides access to a stretcher contained within the chamber 20, to be described more fully below, by opening and closing the upper and lower slidable shutters 36 and 38 respectively. The slidable shutters 36 and 38 may be easily moved within rails, to be discussed, using the handles 50 and 52. Once the stretcher has been unfolded from within the chamber 20, the slidable shutters 36 and 38 can be substantially closed, with the stretcher extending outwardly from the chamber 20 through a space between the edges of the upper and lower slidable shutters 36 and 38 respectively.

While the stretcher access through the upper and lower slidable shutters 36 and 38 is generally shown in the somewhat centered position in FIG. 2 of the drawings (as well as other drawings in this application), there is nothing in this invention which should be seen as limiting the location of the stretcher to this central area. Indeed, the stretcher can be appropriately placed laterally, centered, or anywhere in-between, and the optimal position may be determined by the exigencies of the particular aircraft in which the medical unit 12 is located.

The stacked cupboards in the lateral portion 32, as well as the stacked cupboards in lateral portion 34, may be individually designed to contain various forms of equipment. As an example only, the cupboard 40c may contain special lighting equipment which can be pulled out and adjusted over the stretcher. The cupboard 40a may contain first aid materials and the like. As a matter of practicality, it may be advantageous to place in the stacked cupboards 46a, 46b and 46c heavier equipment, or equipment which may be more infrequently used, or can be adjusted from a distance. It will be appreciated that the stacked cupboards in the lateral portion 34 may be just slightly less accessible than those stacked cupboards on the lateral portion 32, and the placement of different types of medical equipment will, of course, be made according to this and other criteria.

Figure 3:
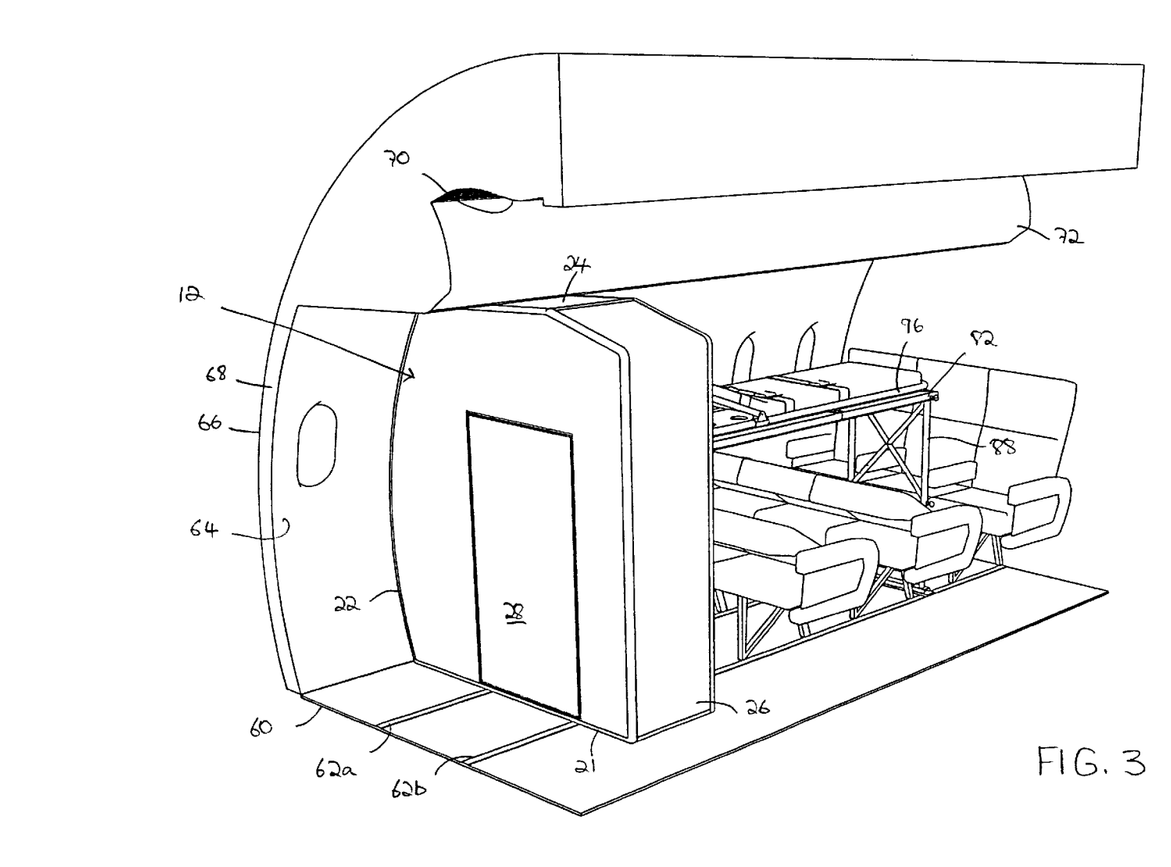
FIG. 3 is a rear perspective view of the medical unit of the invention, when installed within the cabin of an aircraft, shown generally with the stretcher in the unfolded position and the appropriate seat backs down.

FIG. 3 of the drawings shows a rear perspective view of the medical unit 12 when installed within the cabin of an aircraft. Only a small representative section of the cabin is shown, and comprises a floor 60, having a pair of seat tracks 62a and 62b. Further, there is provided an inner wall 64, and an outer wall or skin of the aircraft 66. A space 68 is formed between the inner wall 64 and the skin 66, and is conventionally used for electrical wiring, piping and the like, and the importance of these will be discussed further below in describing how the medical unit 12 of the invention may tap into certain aircraft systems and resources in order function more effectively.

In FIG. 3, it can be seen that a cabin ceiling 70 is provided, and to one side thereof conventional rows of baggage compartments 72 are installed. Like conventional dividers in aircraft cabins, the medical unit 12 of the invention is designed to properly fit within existing cabin structures, and in fact resembles from the outside in large part a simple divider.

It will thus be noted that the base wall 21 of the medical unit 12 rests firmly on the cabin floor 60. The medical unit 12 is secured on the floor 60 by attaching it with appropriate bolts, or other conventional hardware, to existing seat tracks 62a and 62b, which are present as part of the construction in an airliner cabin.

The contoured wall 22 of the medical unit 12 is constructed so as to properly engage with the contoured inner wall 64. The top wall 24 of the medical unit 12 fits in below the baggage compartments 72, while the aisle wall 26 of the medical unit 12 is generally exposed and, with other structures in the cabin, forms a passage through which access from one portion of the cabin to another is secured. It will be seen that the door 28, as shown in FIG. 3, provides enlarged access to the chamber 20 of the medical unit 12, so that personnel may have better access to the contents of the chamber 20 in order to effect installation and maintenance, as may be necessary.

Figure 4:
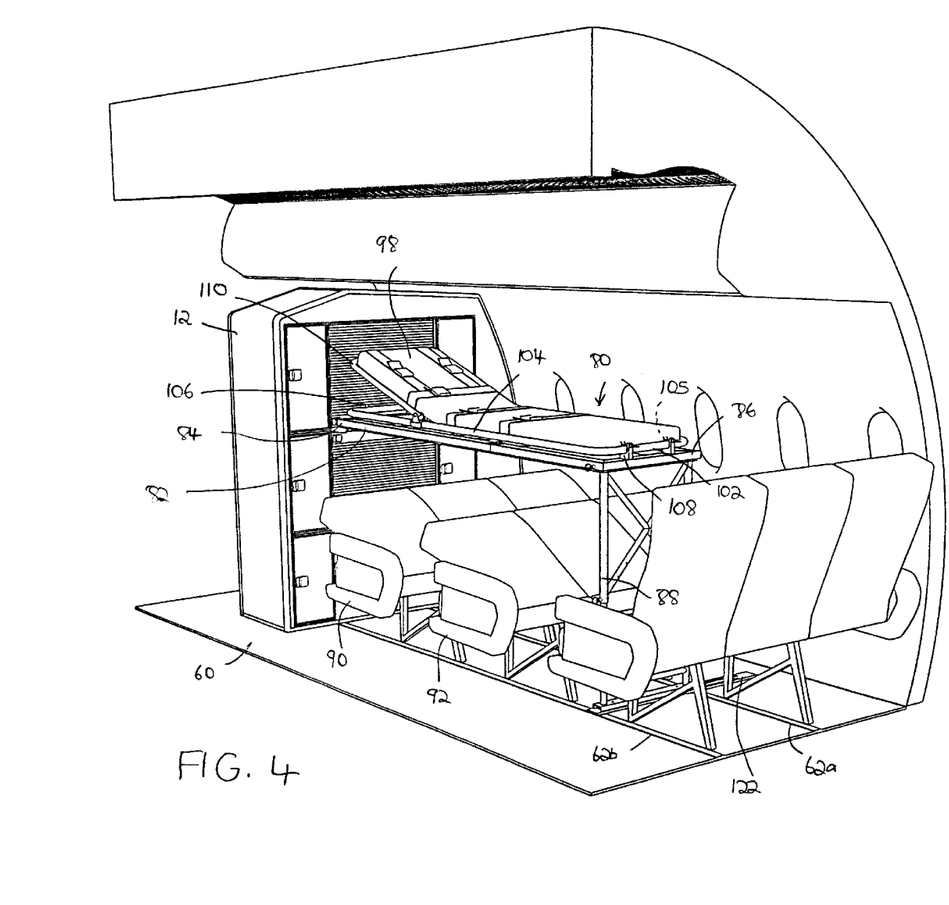
FIG. 4 is a front perspective view of the medical unit of the invention, showing the stretcher in the unfolded or in-use position, and the appropriate seats in the seat-back down position.

Reference is now made to FIG. 4 of the drawings which shows a front perspective view of the medical unit 12 of the invention, with the stretcher 80 in the unfolded or usable position. One aspect of the invention comprises the availability of a stretcher, generally designated by the reference numeral 80, which can be, for the most part, in a stowed position when it is not needed. Most of the time, of course, the stretcher is not needed, and, in this regard, the medical unit 12 provides a very compact space in which the stretcher 80 can be stored. While the availability of the stowed stretcher 80 is an important aspect of the invention, another aspect of the invention relates to the provision of essential medical equipment and machinery in the vicinity of the stretcher 80, so that such equipment can be available for use on an as needed basis. The unfolding and setting up of the stretcher 80 enables the patient to be properly and comfortably positioned, an important factor which must be established before appropriate medical treatment can be provided.

The stretcher 80 in FIG. 4 of the drawings generally comprises a base frame 82, the base frame 82 having a fixed end 84, and an unsecured end 86. The fixed end 84 is attached to components within the chamber 20 of the medical unit 12, while the unsecured end 86 is fixed to a rear support 88. The base frame 82 is thus supported at both ends. At its fixed end 84 it is attached to components within the chamber 20, and at its unsecured end 86, the rear support 88 extends between the base frame 82 and the floor 60, and preferably connects to the seat tracks 62a and 62b, so that the base frame 82 of the stretcher 80 is very firmly and stably fixed. This proper fixing of the stretcher 80 within the cabin is of considerable importance in view of the significant forces which may be placed on the stretcher 80 by virtue of the aircraft movement including take-offs and landings.

As will be seen in FIG. 4 of the drawings, two rows of seats 90 and 92 are adjusted so that their seat backs are folded forwards, to thus create the vertical clearance necessary for the positioning of the stretcher 80.

Once the base frame 82 of the stretcher 80 has been unfolded from the medical unit 12, a mattress frame 96, and mattress 98 are connected to the base frame 82. The mattress frame 96 has a head end 100, a foot end 102, and a pair of side portions 104 and 105 respectively. The head end 100 is secured within a pair of top clamps 106, while the foot end 102 is secured within a pair of bottom clamps 108. The mattress 98 is firmly held within the mattress frame 96, and an elevator frame 110 may be provided so that the patient may be placed with his or her head elevated or inclined, as may be necessary for comfort or treatment. It will be noted that the mattress 98 has a series of straps and clamps, which will not be discussed in any further detail, all or some of which may be used to secure the patient to the mattress 98, as may be required.

The rear support 88 folds away from the base frame 82 so as to preferably be at right angles thereto. The rear support 88 comprises a pair of fixed legs 116, in each of which is located a telescoping leg 118, the telescoping leg 118 being adjustable with respect to the fixed leg 116 so as to place the base frame 82 in a substantially horizontal position, or slightly inclined, as may be required. The telescoping legs 118 are joined by a base plate 120 which has the necessary structure and hardware to enable the rear support 88 to be fastened to the seat tracks 62a and 62b. Furthermore, the aircraft may be provided with a special stretcher-fastening track 122, shown in FIG. 4 of the drawings, the fastening track 122 being substantially at right angles to the seat tracks 62a and 62b, and designed to receive at least a portion of the base plate 120.

Although not specifically shown in FIG. 4 of the drawings, the stretcher 80 may further comprise one or more straps or belts, having one end fixed to the stretcher 80, and the other end peg to a connecting portion in the cabin, such as the seat tracks 62a and 62b. In certain circumstances, such belts may provide additional stability to the stretcher 80 so that its relative movement is very much reduced in response to the natural flying motions of the aircraft.

Figure 5:
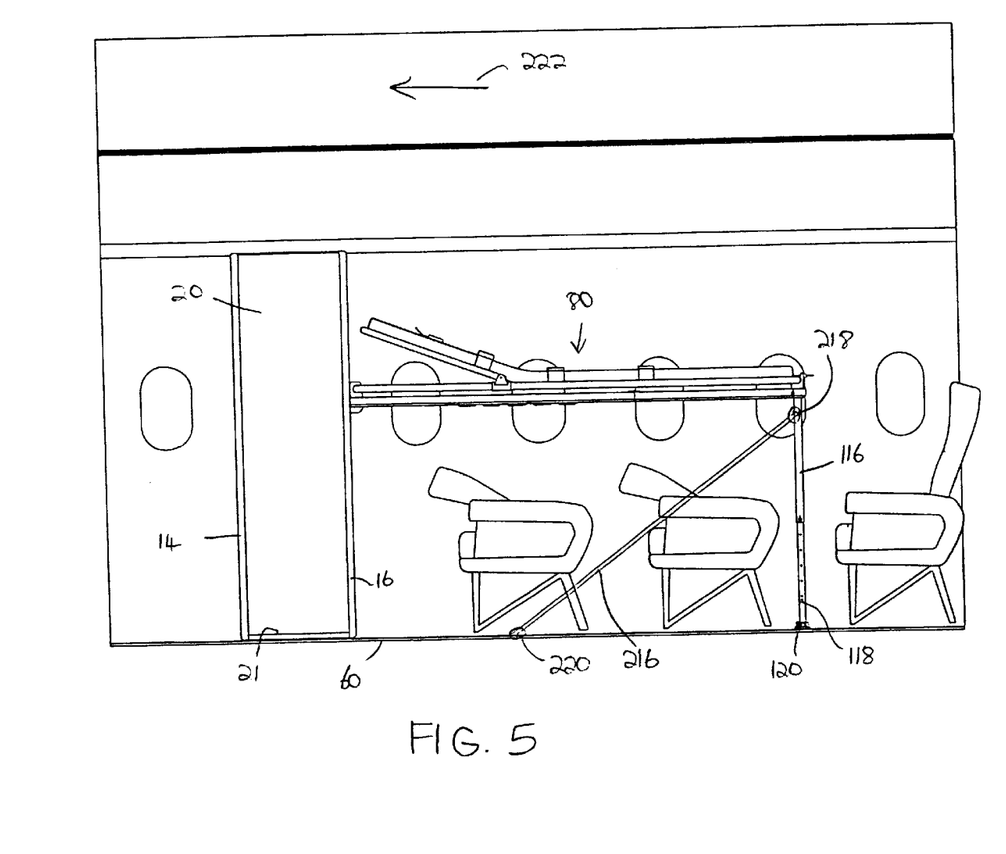
FIG. 5 is a side view of the medical unit of the invention, with the stretcher in the unfolded position.
Figure 6:
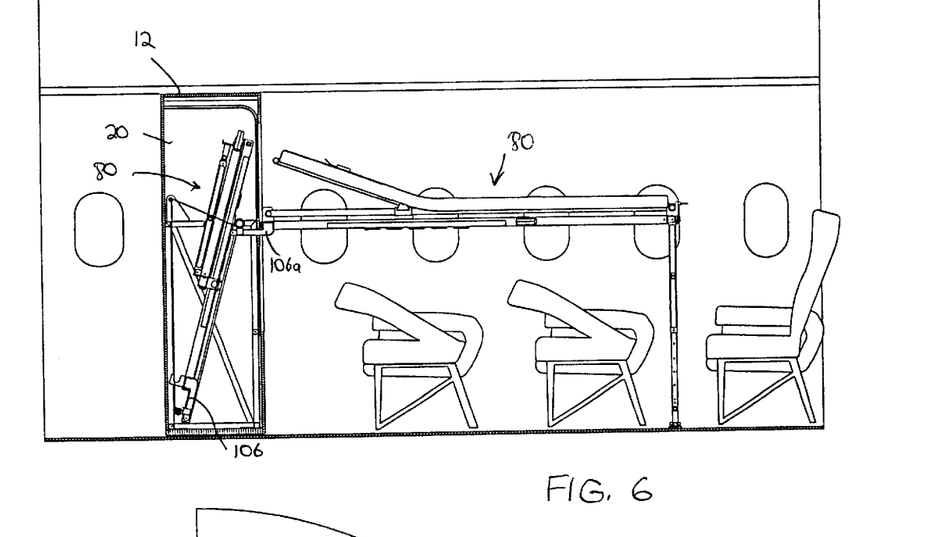
FIG. 6 is a side cross-sectional view through the medical unit of the invention, showing the position of the stretcher in both the folded and the unfolded positions (only one of the positions being possible at a time)
Figure 7:
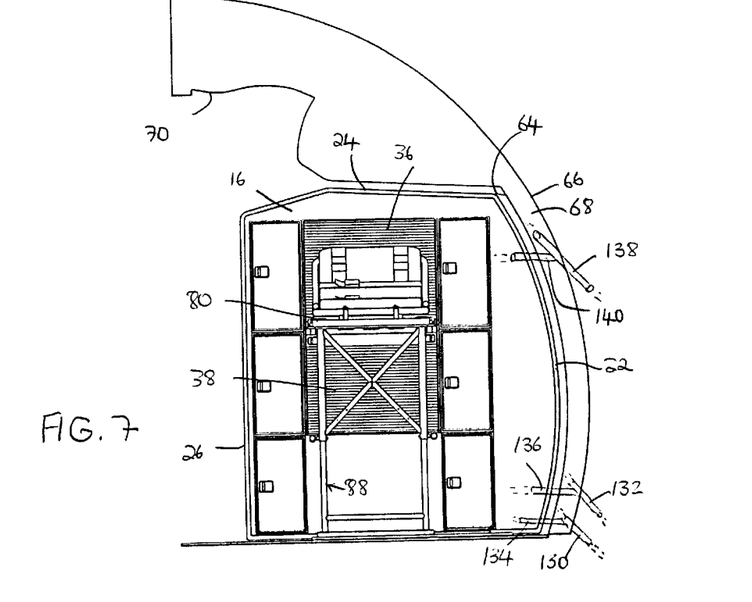
FIG. 7 is a front view of the medical unit of the invention, with the stretcher in the unfolded position.

Reference is now made to FIG. 6 of the drawings which shows a cross-sectional side view, similar to the view shown in FIG. 4 and FIG. 5, but also showing the stretcher in the folded position within the chamber 20 of the medical unit 12. The stored/stowed position of the stretcher 80, as shown in FIG. 6 of the drawings will be described in further detail with reference to FIG. 8 of the drawings. However, it can be seen in FIG. 6 that the top clamp 106a is held in a fixed position when the stretcher 80 is in the unfolded position, and is designed to be at the appropriate height when the stretcher 80 is in the unfolded position. FIG. 7 of the drawings shows a view of the medical unit and unstowed stretcher when looking towards the front thereof, also showing the various cupboards and/or compartments designed to house various items of equipment and machinery. As has been mentioned, the medical unit 12 of the invention may comprise any one or more of a fairly wide range of equipment and machinery, and many of these items require power. Other pieces of equipment may require oxygen, wiring for various forms of communication, and the like, and to the extent possible, the medical unit 12 of the invention taps into existing power and other systems in the aircraft.

The power lines, oxygen conduits, electrical and communication wirings and the like, may be conveyed in different forms and locations, depending on the type of aircraft. Thus, these sources may be contained in the space 68 formed between the outer skin or the aircraft and the inner wall 64. Alternatively, these sources may run under the floor 60 of the cabin, or above the ceiling 70. For the purposes of this invention, it does not really matter where the sources are located, but a medical unit 12 designed for a specific aircraft would, of course, take these factors into account so that appropriate connectors to power, oxygen and communication systems can be readily achieved. As an example only, FIG. 7 shows an oxygen supply line 130 and an electrical supply line 132 running in the space 68. The oxygen supply is tapped by means of a connector 134, so that aircraft oxygen can be used, where necessary, by equipment contained within the medical unit 12 for patient treatment. Likewise, a connector 136 taps into the electrical supply of the aircraft so as to power the various pieces of equipment and systems which may form part of the medical unit 12. Also shown running through the space 68 are communication lines 138, which are tapped by connector 140 and directed to appropriate equipment within the medical unit 12 for use as needed, so that personnel operating the medical unit 12 can establish the desired lines of communication both within the aircraft, and with land-based resources.

Figure 8:
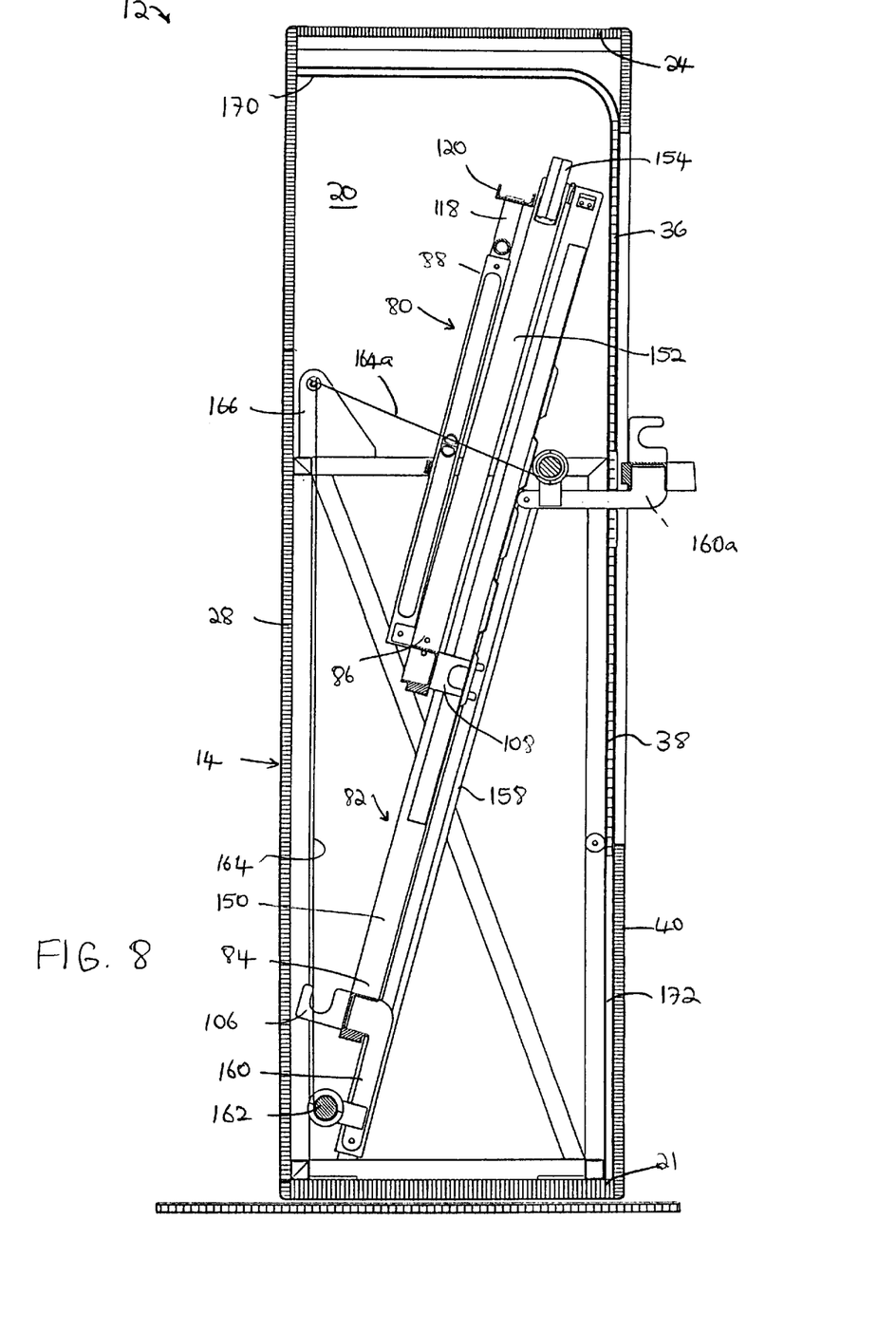
FIG. 8 is a detailed cross-sectional view of the stretcher in the medical unit, shown in the folded or non-use position.

Reference is now made to FIG. 8 of the drawings, which shows a detailed view of one embodiment of the stowed stretcher 80, contained within the chamber 20 of the medical unit 12. The medical unit 12 is shown as comprising the components discussed above, including the base wall 21, rear panel 14, top panel 24, upper slidable shutter 36, lower slidable shutter 38, the door 28 and various other components. As will be noted from FIG. 8, the base frame 82 is in a folded condition/position, and comprises a forward section 150, and a rear section 152, connected to each other by means of a hinge 154. The rear support 88 is pivotally or hingedly connected to the rear section 152 and folds out to a position essentially normal to the rear section 152 so as to provide the necessary support as shown in, for example, FIG. 6 of the drawings. The base frame 82, when in the folded position, shows one of the top clamps 106, and a bottom clamp 108, the clamps 106 and 108 being configured so as to receive the mattress frame 96. In the particular embodiment shown, the mattress frame 96, also contained within the chamber 20, is unfolded independently and positioned on the base frame 82, and thereafter clamped into position using clamps 106 and 108. In alternative embodiments, the mattress frame 96, as well as the mattress 98 may also be foldable, so that when the base frame 82 is unstowed, the mattress frame 96 and mattress 98 are already in position.

Within the chamber 20 of the medical unit 12, there is provided a track 158, and a bracket 160, attached near the fixed end 84 of the base frame 82, including a wheel, or other component, which slides up and down in the track 158 when the base frame 82 is moved between he stowed and unstowed positions. In FIG. 8 of the drawings, the bracket 160, when shown near the base wall 21, illustrates its position when the base frame 82 is in the stowed position, and the illustration of the bracket 160a, extending outside the chamber 20, illustrates its position when the base frame 82 is in the unstowed or extended position.

The bracket 160 includes a reel 162, upon which a cable 164 can be wound. The cable 164 connects at one end to the reel 162, and to a winch-like or cable attachment structure 166 mounted in the chamber 20. The structure 166 may include spring-biased components so as to draw in the cable 164, and to facilitate unstowing of the base frame 82, when the stretcher 80 is required. Alternately, the spring-biasing may be in the reel 162.

In order to move the stretcher 80, and more particularly the base frame 82 thereof, from the stowed to the unstowed position, the upper slidable shutter 36 is moved upward to slide into an open position, along the tracks 170. Similarly, the lower slidable shutter 38 is moved downwardly along track 172, at which point an opening is provided to access the base frame 82. The operator then pulls the forward section 150 upwardly and outwardly, so that the bracket 160 runs along the track 158, and, at the same time, the forward section 150 moves out from the chamber 20 and into the cabin of the aircraft, as illustrated, for example in FIG. 6 of the drawings. When the bracket 160 has reached the position shown as bracket 160a, the rear section 152 is unfolded by pivoting it about the hinge 154, so that the forward section 150 and the rear section 152 together make up a substantially rectangular base frame 82. The rear support 88 is then pivoted or unfolded downwardly so that the base plate 120 is on the floor 60 of the cabin, and supports the base frame 82. The base frame 82 is thus supported by the clamp 160a and the rear support 88. A locking mechanism may be provided to place the bracket 160a in a position so that movement thereof will be restrained, to provide additional stability to the stretcher 80 when in the unstowed position.

In order to facilitate unfolding, the user is assisted by the operation of the cable 164, which tends to raise the base frame out of the chamber 20. Reference numeral 164a shows the cable in its position when the stretcher is in the unstowed position.

It will be appreciated that only one of many embodiments of a folded and stowed stretcher 80 is shown in FIG. 8 of the drawings. It is not intended that the invention in any way be limited to the specific structure and configuration of the foldable stretcher 80 shown in the various drawings. The only factor of importance in this regard is that the stretcher 80 is configured and dimensioned such that it can move in and out of an access space, which may be opened and closed in the medical unit 12. The importance of the invention is that a stretcher 80 is provided, but in normal circumstances is stowed in a relatively compact area until it is needed.

Figure 9:
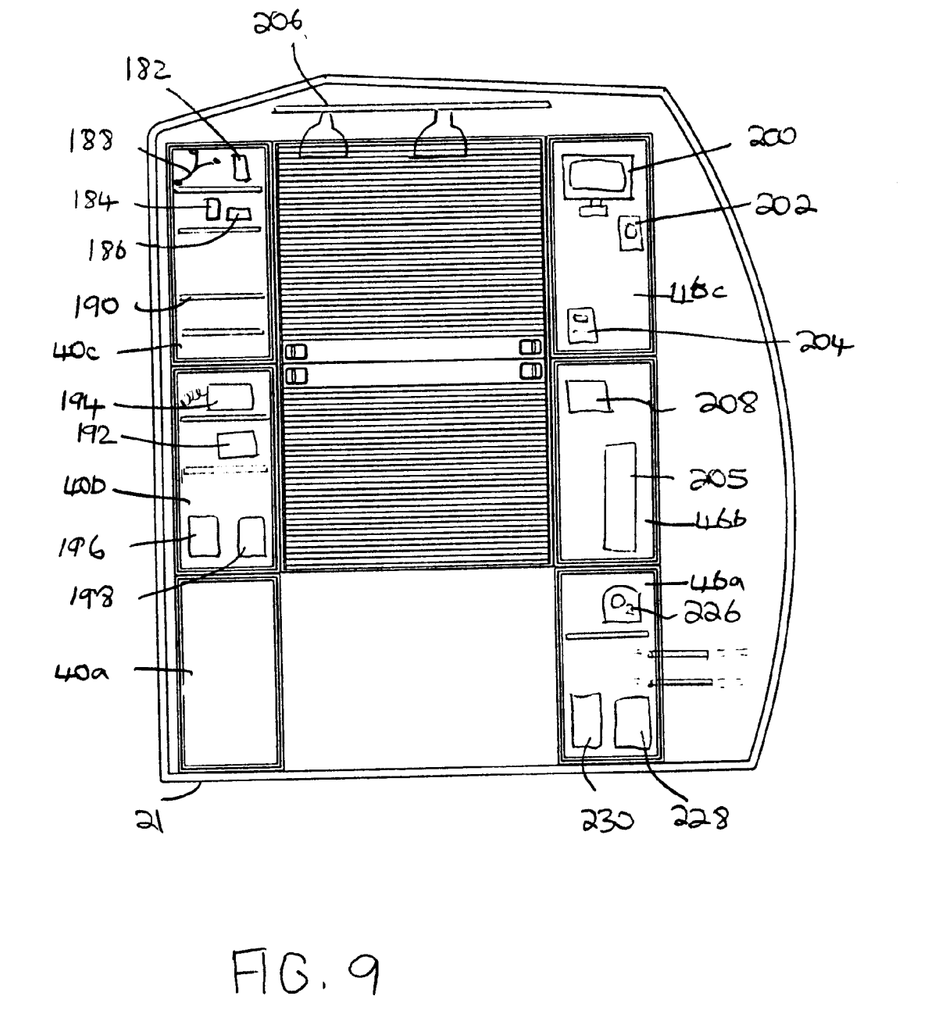
FIG. 9 is front view of the medical unit of the invention illustrating some of the equipment and machinery associated therewith.

Reference is now made to FIG. 9 of the drawings, which illustrates a representative example of the types of equipment and machinery which may be used in the medical unit 12 of the invention. In FIG. 9, for illustrative purposes, the doors to the various enclosures have been removed. Thus, on the one side, a schematic view of the inside of stacked cupboards 40a, 40b, and 40c are shown, while on the other side, stacked cupboards 46a, 46b and 46c are shown with their interiors exposed. Within these various closets, which of course extend back into the chamber 20 and preferably utilize as much of the space as is possible, a wide variety of different types of equipment can be stored. Examples of such supplies and equipment include trauma kits and bags 182, which may include dressings, bandages 184, eye pads, antibiotic ointments, blood pressure kits 186, blankets, stethoscopes 188 and forceps, to name just a small selection of more commonly used items. These may be arranged conveniently on shelves 190, shown in this example as being contained in the closet 40c. The kits may be divided and prepared according to the type of condition being treated, so that in the case of an emergency medical treatment on board, the user could access a kit within the medical unit 12 of the invention which essentially contains all of the supplies necessary to treat that condition.

In addition to the basic medical first aid supplies, more sophisticated equipment may be provided and appropriately connected to sources of power which enable their operation. Examples of such equipment which may be included in the medical unit are respirators 192, IV infusion pumps 194, as well as their requisite controls, suction apparatus, defibrillators 196, blood pressure equipment 198 and resuscitators, to name but a few. Some of these items are illustrated schematically in FIG. 9 of the drawings, and each may be positioned according to its size and likelihood of use. The invention is not, however, intended to be limited to any specific type or combination of equipment that may be stored in the medical unit 12, but it should be appreciated that the medical unit 12 itself can accommodate a wide variety of equipment, and combinations thereof.

In addition to the equipment for treating patients, the medical unit 12 of the invention may also comprise a monitor 200, a camera 202, communication equipment and Global Positioning Systems 204. This equipment may enable passengers or crew within the aircraft to make real-time contact with doctors, hospitals or other health providers who are able to provide relevant guidance and information to assist in the treatment process. For example, the medical unit 12 may include a camera 202 which may photograph the patient and transmit the information to a doctor or hospital which is land based. A health professional would be able to guide people treating the patient, and the land based health professional can monitor patient color or complexion, wounds, or treatment processes, and provide immediate guidance. Further, information from outside sources may be communicated to the system and displayed on the monitor, which may provide assistance to the people treating the patient.

In another form, the medical unit may also comprise lighting equipment 206 which may be stored within or outside of the chamber 20, and which can be removed and appropriately located over the patient to provide sufficient light. Clocks, timers and other basic equipment may also form part of the medical unit.

In a preferred form, the medical unit of the invention would tap into the power and oxygen supply within the aircraft generally. However, additionally, the medical unit would also have its own power supply system in the form of a battery or other component, or oxygen tanks, which could be relied upon if other systems within the aircraft failed. In addition to the power supply system, the medical unit may also comprise power interface systems so that the aircraft power can be modulated or changed to a form which can be used by any of the components within the medical unit. As an example, some aircraft may provide power at 110 volts and 400 cycles, and this may be changed by appropriate equipment to 110 volts and 60 cycles, a form which may be used by most of the equipment. Further, an inverter may be provided for changing DC power to AC power, or vice versa.

The medical unit may also comprise its own oxygen supply 226. In FIG. 9, an auxiliary power unit or generator is shown at 228, while appropriate convertor means 230 are shown in the same Figure, and this may be used for converting the aircraft power systems to a usable form by apparatus and equipment within the medical unit.

Additionally, it should be noted that some or all of the equipment and machinery contained in any one of the closets, or surrounding the medical unit, may be removed therefrom and placed with appropriate clamps around the stretcher, preferably on the base frame 82 or the mattress frame 96. Thus, for example, a camera 202 may be removed from the closet, and clamped onto the mattress frame 96 at an appropriate location, so that the camera is directed into the desired position. The camera may be joined to power and other communication lines either by cable, or it may contain its own power unit or battery, and transmit wirelessly to the medical unit for onward transmission, as required. Similarly, lighting may be appropriately placed around the stretcher 80 by clamping it, as discussed, as may be any other of the equipment or machinery contained within or as part of the medical unit.

The medical unit 12 may further comprise other pieces of equipment such as a refrigerator 205, an autoclave 208 for sterilizing instruments, and may also include such equipment as an incubator, not specifically shown in the drawings.

In FIG. 5 of the drawings, there is also illustrated a typical securing means which could optionally be installed to provide further support and integrity to the stretcher 80 when in the unfolded position. In FIG. 5, the stretcher 80 has a belt 216 connected at hinge 218, or indeed at any other point along the stretcher 80, and extends obliquely down towards the floor 60 of the cabin, where it fastens to a connector 220 on the floor 60 of the craft. The purpose of this belt 216 is to counteract the natural forces which may arise due to the acceleration or deceleration of the aircraft. The aircraft moves in the direction indicated by arrow 222 in FIG. 5. When accelerating, the stretcher 80 would therefore tend to move backwards, towards the rear of the aircraft due to the acceleration forces. Any such movement is significantly and substantially restrained by the belt 216 fastened to the floor 60 of the cabin. When the aircraft is decelerating, the front panel would serve to operate as a barrier, and prevent any forward movement as a result of the deceleration forces.

It will be appreciated that the medical unit of the invention is not limited to the precise details which have been described above. The precise shape, width and configuration of cupboards shown in the drawings and described herein may be varied depending on the type of equipment which is stored. Further, the nature of storing the stretcher, and the manner in which it unfolds, can vary. Of course, the medical equipment stored within the medical unit can vary widely, both in terms of the amount of equipment, as well as its nature.

While, for most purposes, a passenger commercial airliner may typically only require one medical unit 12 on board, there is nothing to prevent a plurality of such units from being located and spaced about the aircraft. Different units within an aircraft may be either more or less sophisticated, depending upon anticipated requirements. Further, an aircraft may be converted into a mobile hospital of sorts by installing a plurality of the medical units 12 spaced throughout the cabin, so that an aircraft can travel to an emergency area, and stretchers unfolded in each unit so as to provide multiple treatment bays on the aircraft.

What is claimed is:

1. An aircraft medical unit comprising:
   a front panel configured to fit in an aircraft cabin so as to form a divider inside the cabin;
   a rear panel of substantially the same shape as that of the front panel and spaced therefrom;
   a side panel between the front and rear panels, the front, rear and side panels defining a chamber;
   an access opening in the front panel; and
   a stretcher frame, movable between a folded and stowed position in the chamber and an unfolded and extended position to the outside of the chamber.

2. An aircraft medical unit as claimed in claim 1 wherein the front panel is configured so as to fit in the aircraft cabin between rows of seats, the front, rear and side panels following the contour of the shape of at least a portion of the aircraft cabin.

3. An aircraft medical unit as claimed in claim 1 further comprising at least one item of medical equipment used in the treatment of a patient.

4. An aircraft medical unit as claimed in claim 3 wherein the equipment is a monitor.

5. An aircraft medical unit as claimed in claim 3 wherein the equipment is a camera.

6. An aircraft medical unit as claimed in claim 3 wherein the equipment is a refrigerator.

7. An aircraft medical unit as claimed in claim 3 wherein the equipment is an incubator.

8. An aircraft medical unit as claimed in claim 3 wherein the equipment is a defibrillator.

9. An aircraft medical unit as claimed in claim 3 wherein the equipment is a respirator.

10. An aircraft medical unit as claimed in claim 3 wherein the equipment is an oxygen supply.

11. An aircraft medical unit as claimed in claim 3 wherein the equipment is an autoclave.

12. An aircraft medical unit as claimed in claim 1 wherein the access opening can be opened and closed by doors.

13. An aircraft medical unit as claimed in claim 12 wherein the doors comprise a pair of slidable shutters which run in tracks formed within the chamber of the medical unit.

14. An aircraft medical unit as claimed in claim 1 further comprising a plurality of cupboards, each cupboard accommodating selected medical equipment or machinery.

15. An aircraft medical unit as claimed in claim 1 further comprising an access door in the rear panel for providing access to the chamber for installation and maintenance.

16. An aircraft medical unit as claimed in claim 1 wherein the stretcher frame comprises a head end portion, a foot end portion and a foot end support leg, wherein the head end portion and foot end portions, and the foot end support leg are pivotally connected to each other so as to fold for stowage within the chamber, the head end portion and foot end portion unfolding in the extended position to form a substantially rectangular stretcher frame, and the foot end support leg being attached to the foot end portion and unfoldable with respect thereto, the head end portion being securely fastened to a clamp within the chamber when in the extended position, and the foot end support leg being unfolded to fasten to the aircraft cabin when in the extended position.

17. An aircraft medical unit as claimed in claim 1 further comprising a mattress frame and an associated mattress connectable to the stretcher frame.

18. An aircraft medical unit as claimed in claim 1 further comprising a belt extending between the stretcher frame at its one end, and fastenable to the cabin at its other end, to provide further stability to the stretcher frame when in the unfolded and extended position.

19. An aircraft medical unit as claimed in claim 1 further comprising adjustable lighting for positioning over the stretcher.

20. An aircraft medical unit as claimed in claim 3 further comprising a power unit.

21. An aircraft medical unit as claimed in claim 3 further comprising a power converter for converting aircraft power into a power source usable by the medical equipment.

22. An aircraft medical unit as claimed in claim 1 further comprising communication equipment to enable personnel at the medical unit to communicate within the aircraft and with land-based sources.

23. An aircraft medical unit as claimed in claim 1 wherein the stretcher frame is spring-mounted within the chamber to facilitate movement thereof between the folded and the stowed position on the one hand, and the unfolded and extended position on the other.

24. An aircraft medical unit as claimed in claim 3 further comprising at least one clamping member for attaching an item of medical equipment to the stretcher frame at a desired location.

25. An aircraft medical unit as claimed in claim 1 further comprising attachment members for securing the medical unit to tracks constructed in the cabin of the aircraft.

26. An aircraft medical unit as claimed in claim 1 further comprising an oxygen supply connector for connecting the medical unit to the oxygen supply within an aircraft.

27. An aircraft medical unit as claimed in claim 1 further comprising communication system connector for connecting to the communication system within the aircraft.

* * * * *